United States Patent [19]

McCormick

[11] Patent Number: 4,764,135
[45] Date of Patent: Aug. 16, 1988

[54] MARINE STERN DRIVE OIL COOLING AND CIRCULATING AS WELL AS PUMPING SYSTEM

[75] Inventor: Daniel F. McCormick, Oshkosh, Wis.

[73] Assignee: Brunswick Corporation, Skokie, Ill.

[21] Appl. No.: 64,197

[22] Filed: Jun. 17, 1987

[51] Int. Cl.⁴ .......................................... B63H 21/10
[52] U.S. Cl. ...................................... 440/83; 440/88
[58] Field of Search ................ 440/88, 89, 900, 78, 440/83

[56] References Cited

U.S. PATENT DOCUMENTS

| 3,181,495 | 5/1965 | Kiekhaefer | 440/88 |
| 3,520,272 | 7/1970 | Ellzey | 440/88 |
| 3,645,360 | 2/1972 | Holtermann | 184/6.18 |
| 4,650,430 | 3/1987 | Schiek | 440/88 |

FOREIGN PATENT DOCUMENTS 188789  11/1983  Japan .................................. 440/88

OTHER PUBLICATIONS

Mercury Service Manual, 1984, No. 90-97658—3 (4pages).

Primary Examiner—Joseph F. Peters, Jr.
Assistant Examiner—Stephen P. Avila
Attorney, Agent, or Firm—Andrus, Sceales, Starke & Sawall

[57] ABSTRACT

In a marine stern drive unit (1), oil is circulated upwardly from the propeller housing (9) and through the drive shaft sleeve (22) to the upper gear case (7). A return oil line (28) connects from the upper gear case and downwardly through the lower gear case (8) to the propeller housing. The return line is disposed within a cooling water chamber (33) communicating with the drive engine (4) to create an intercooling or heat exchanging effect whereby the incoming water from a lake or the like cools the recirculating stern drive unit lubricant. A combination of threaded drive shaft (13, 36) and internally grooved sleeve (37, 38) is utilized to pump the oil through the system.

7 Claims, 2 Drawing Sheets

MARINE STERN DRIVE OIL COOLING AND CIRCULATING AS WELL AS PUMPING SYSTEM

BACKGROUND AND SUMMARY OF THE INVENTION

This invention relates to a marine stern drive oil cooling and circulating as well as pumping system. Such stern drives are contemplated for use with a marine internal combustion engine which is mounted inboard of a boat. The rotary engine output is connected through the boat transom to the stern drive unit, which is mounted to the transom and which includes suitable upper and lower gear cases. A vertical drive shaft is suitably mounted within the lower gear case. The drive shaft is rotatably driven by the engine output shaft, and in turn rotatably drives a lower horizontal propeller shaft. The various shafts are mounted on suitable bearings. In addition, stern drive units have included a water passage in the drive housing for receiving engine cooling water through submerged intake ports and transferring the water upwardly and ultimately to the engine.

It is desired that the moving parts of the stern drive unit be suitably lubricated. Prior known lubricating systems have included a series of oil containing interconnected passages and chambers extending from top to bottom of the stern drive unit and which are in communication with the various shafts and bearings. The oil passages and chambers have been arranged remote from the cooling water passage and provide a recirculating path for the oil. Some prior marine propulsion devices have included pumping devices associated with the vertical drive shaft for circulating the oil. These known pumping devices have included internal helixes on the interior of the drive shaft's fixed guide sleeve, such as is suggested in U.S. Pat. No. 4,650,430. Interior threads have also been used on the sleeve. The drive shaft bodies in these instances have been plain and uninterrupted. Other known devices have included a screw formation on the drive shaft itself, used in conjunction with a plain uninterrupted interior sleeve wall.

The temperature of the oil within the stern drive unit should preferably be as low as possible for maximum effective operation of the lubricating system, and the present invention is primarily directed to a concept which accomplishes this aim. Improved pumping is also contemplated.

In accordance with the various aspects of the invention, oil is circulated upwardly from the propeller housing and through the drive shaft sleeve to the upper gear case. A return oil line is provided and which connects from the upper gear case and downwardly through the lower gear case to the propeller housing. The return line is disposed within the stern drive housing's cooling water passage to create an intercooling or heat exchanging effect whereby the incoming water from a lake or other body of water cools the recirculating stern drive unit lubricant. A combination of threaded drive shaft and internally grooved sleeve is utilized to pump the oil through the system.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENTS

Figure 1:
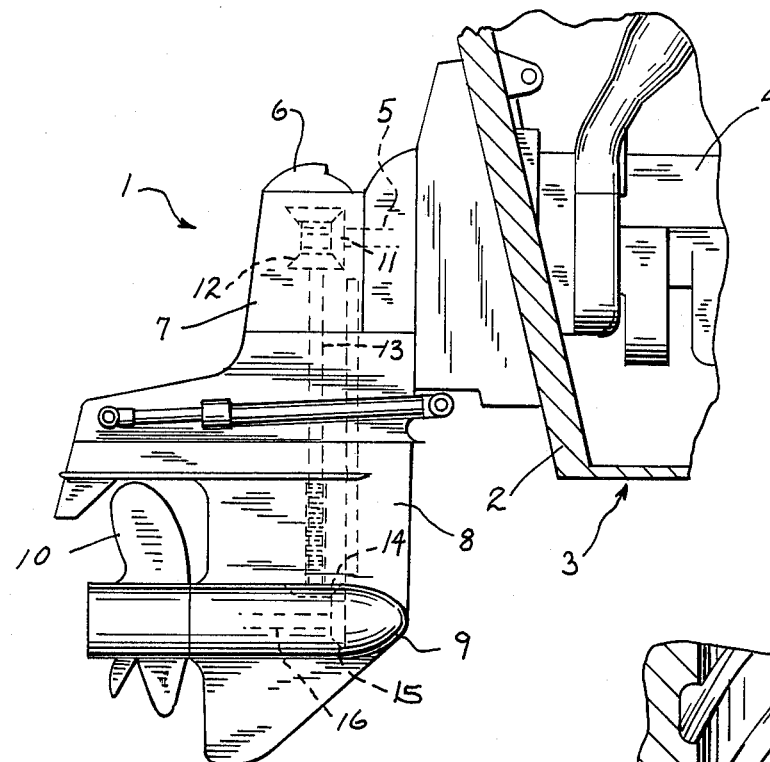
FIG. 1 is a schematic perspective view of a boat-mounted marine stern drive unit which incorporates the various aspects of the invention.

As shown in the drawings, the various aspects of the invention are contemplated for utilization in a stern drive unit 1 adapted to be suitably mounted to the transom 2 of a boat 3. An internal combustion engine 4 is disposed within the boat and includes an output with a shaft 5 which extends through transom 2 to unit 1, in the usual manner.

Stern drive unit 1 generally includes a stern drive housing 6 forming an upper gear case 7, a lower gear case 8 suitably mounted to gear case 7, and a propeller housing 9 disposed at the bottom of gear case 8, with housing 9 having the usual propeller 10 mounted for rotation thereon. For purposes of driving propeller 10, a pinion 11 is disposed on the outer end of shaft 5 and meshes with a gear 12 mounted to the upper end of a vertical drive shaft 13 within upper gear case 7. Drive shaft 13 extends downwardly and through lower gear case 8, and has a pinion 14 on its lower end which meshes with a gear 15 on the inner end of a propeller shaft 16 within propeller housing 9.

Lubricant-requiring bearing means are disposed within gear cases 7 and 8, as well as within propeller housing 9 for supporting the various rotatable shafts. For this purpose, and as shown, roller bearings 17, 18 and 19 are disposed about shafts 5, 13 and 16 respectively.

Figure 2:
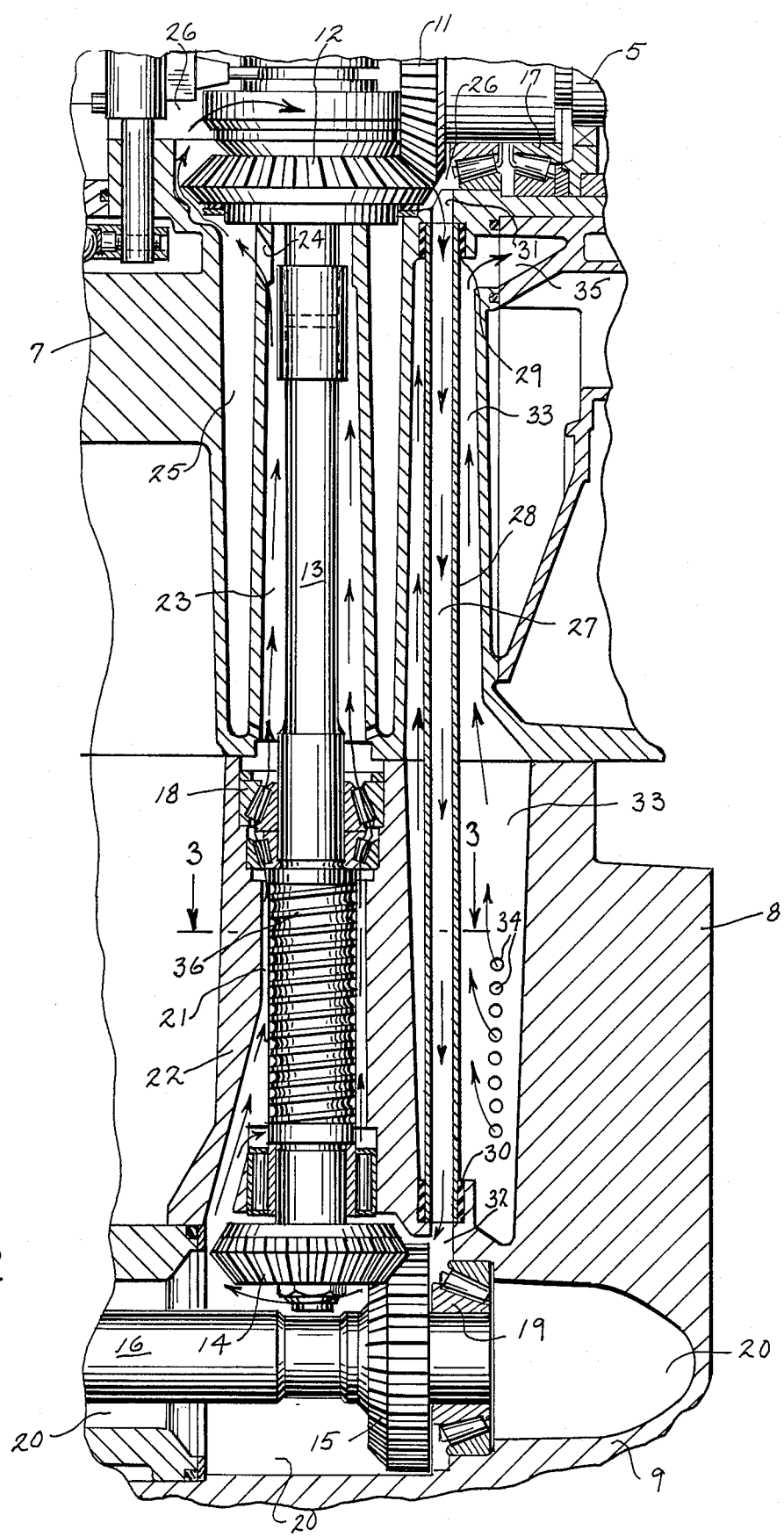
FIG. 2 is an enlarged fragmentary vertical section of the stern drive unit.

The various shafts, gears and bearings are disposed within a closed loop system of passages and chambers which are adapted to contain suitable flowable lubricating oil. As shown, and beginning at the bottom of FIG. 2, an oil chamber 20 is disposed within propeller housing 9 in communication with pinion 14, gear 15 and propeller shaft 16. Chamber 20 further communicates upwardly around pinion 14 to an elongated annular oil passage 21 formed between the lower portion of drive shaft 13 and a fixed vertical guide sleeve 22 which encompasses the latter and will be described more fully hereinafter. Oil passage 21 extends upwardly through bearing 18 into a further elongated annular oil passage 23 in sleeve 22. A port 24 disposed in sleeve 22 at the upper end of passage 23 communicates outwardly and upwardly through a concentric chamber 25 formed by the sleeve, so that oil can pass around gear 12 and into an oil chamber 26 formed in upper gear case 7 which is in communication not only with gear 12 but also bearing 17.

The return portion of the recirculating oil closed loop comprises a return passage 27 formed by a tubular return line 28 which is sealingly mounted to gear cases 7 and 8, as by upper and lower seals 29 and 30 respectively. The upper end of passage 27 communicates with upper oil chamber 26 via a port 31, while the lower end of passage 27 communicates with lower oil chamber 20 via a port 32.

For cooling the circulating lubricating oil, passage 27 is disposed in heat exchanging relationship with the incoming cooling water for the engine. For this purpose, housing 6 is provided with a vertically extending water chamber 33 to one side of the sleeve 22, with water chamber 33 having submerged intake openings 34 in lower gear case 8 for receiving water thereinto from the body of water. The upper end of chamber 33 within upper gear case 7 communicates through a port 35 which in turn connects to engine 4 in the usual manner for cooling the latter. Oil return line 28 is disposed within chamber 33 and is completely surrounded by water therein and is generally vertically coextensive with drive shaft 13 and water chamber 33. If desired, return line 28 may be provided with fins or the like to enhance the heat exchanging relationship whereby the oil is cooled by the incoming water.

Figure 3:
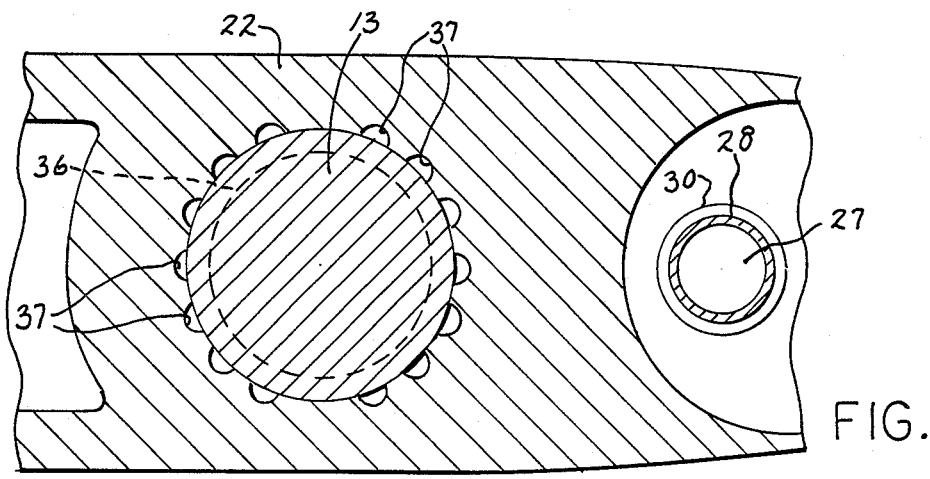
FIG. 3 is a transverse section taken on line 3—3 of FIG. 2.

Pump means formed by cooperative elements on drive shaft 13 and sleeve 22 are provided to cause the oil to circulate between propeller housing 9 and upper gear case 7. The pump means is adapted to continuously circulate oil through return passage 27 and also to provide a continuous recirculation of oil through the entire system. For this purpose, and in the embodiment of FIGS. 2, 3 and 4A, the lower portion of the body of drive shaft 13 within lower gear case 8 is formed with threads 36 on its exterior, while axially longitudinally extending arcuately spaced generally linear vertical grooves 37 are formed on the interior wall of housing sleeve 22. It has been found that grooves 37 increase the viscous drag of the oil so that the oil does not turn with the screw formed by rotating threads 36. This type of pump will function quite adequately in a system wherein drive shaft 13 is designed to rotate in both forward and reverse directions, as where a propeller-reversing clutch is disposed between engine 4 and drive shaft 13.

Figure 4B:
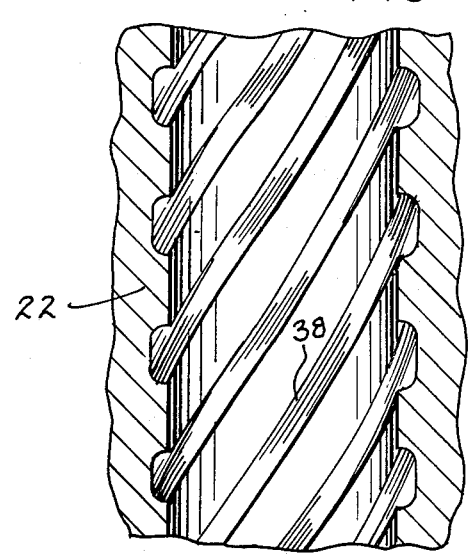
FIG. 4B is a similar view of yet another embodiment of sleeve.
Figure 4A:
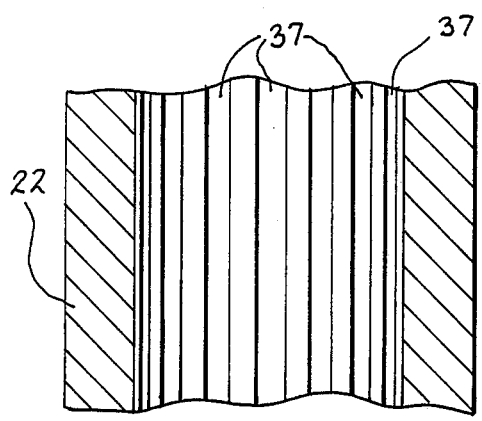
FIG. 4A is a fragmentary vertical sectional view of the FIG. 3 embodiment of drive shaft sleeve.

In the event a clutching mechanism is disposed between drive shaft 13 and propeller shaft 16, shaft 13 rotates unidirectionally at all times except when the clutch is in non-rotational neutral. In such a situation, the pumping function is enhanced if in addition to threads 36 on drive shaft 13, spaced helical grooves 38 are formed interiorly of housing sleeve 22, as shown in FIG. 4B. Grooves 38 should extend in the direction of drive shaft rotation and spiral upwardly and in the direction of fluid flow and cooperatively assist threads 36 in pumping the fluid.

The aspects of the invention provide an improved stern drive unit construction wherein the lubricant for the working stern drive parts is cooled by cool water in the gear case and by the incoming engine cooling water. In additon, cooperative elements on both the drive shaft and its guide sleeve function to provide an improved oil pumping arrangement.

Various modes of carrying out the invention are contemplated as being within the scope of the following claims particularly pointing out and distinctly claiming the subject matter which is regarded as to the invention.

I claim:

1. A marine stern drive unit (1) for connection to a marine engine (4) having an output and with said unit comprising, in combination:
   (a) a generally vertical stern drive housing (6) forming an upper gear case (7), a lower gear case (8), and a propeller housing (9) mounting a propeller (10),
   (b) a vertically extending elongated water chamber (33) disposed in said stern drive housing and with said water chamber having lower water means (34) in said lower gear case, and having upper water discharge means (35) in said upper gear case for providing cooling water to the engine,
   (c) lubrication-requiring drive elements (5, 11–19) disposed within said stern drive housing for connecting a said engine output with said propeller,
   (d) and an oil containing closed loop extending between the upper and lower portions of said stern drive housing and with said loop communicating with said drive elements, said loop including:
     (1) first passage means (21, 23, 24) extending upwardly within said stern drive housing and communicating between said propeller housing and said upper gear case,
     (2) and return passage means (27, 28) extending downwardly within and surrounded by said water chamber and communicating from said upper gear case and through said lower gear case to said propeller housing to thereby form a heat exchanger means between the water in said water chamber and the oil in said return passage means to cool the said oil,
   (e) and pump means (36–38) disposed in said closed loop to provide circulation of oil through said return passage means (27, 28).

2. A marine stern drive unit (1) for connection to a marine engine (4) having an output and with said unit comprising, in combination:
   (a) a generally veritcal stern drive housing (6) forming an upper gear case (7), a lower gear case (8), and a propeller housing (9) mounting a propeller (10),
   (b) a vertically extending elongated water chamber (33) disposed in said stern drive housing and with said water chamber having lower water intake means (34), and having upper water discharge means (35) for providing cooling water to the engine,
   (c) lubrication-requiring drive elements (5, 11–19) disposed within said stern drive housing for connecting a said engine output with said propeller,
   (d) an oil containing closed loop extending between the upper and lower portions of said stern drive housing and with said loop communicating with said drive elements, said loop including:
     (1) first passage means (21, 23, 24) extending upwardly within said stern drive housing and communicating between said propeller housing and said upper gear case,
     (2) and return passage means (27, 28) extending downwardly within said water chamber and communicating between said upper gear case and said propeller housing to thereby form a heat exchanger means between the water in said water chamber and the oil in said return passage means to cool the said oil,
   (e) and pump means (36–38) disposed in said closed loop to provide circulation of oil through said return passage means (27, 28),
   (f) an elongated sleeve (22) extending vertically between said upper gear case (7) and said propeller housing (9),
   (g) a rotatable drive shaft (13) disposed within said sleeve and with said drive shaft being generally coextensive with said water chamber (33), (h) said sleeve and said drive shaft forming at least a part of said first passage means (21, 23, 24) therebetween, (i) said pump means comprising cooperative elements (36, 37, 38) on said drive shaft (13) and on the interior of said sleeve (22) for recirculatingly pumping oil through said first passage means (21, 23, 24) and said return passage means (27, 28).

3. The marine stern drive unit of claim 2 in which:
(a) said cooperative elements on said drive shaft (13) comprise threads (36) on the drive shaft body,
(b) and said cooperative elements on the interior of said sleeve (22) comprise a plurality of arcuately spaced generally linear vertical grooves (37).

4. The marine stern drive unit of claim 2 in which:
(a) said cooperative elements on said drive shaft (13) comprise threads (36) on the drive shaft body,
(b) and said cooperative elements on the interior of said sleeve (22) comprise a plurality of spaced helical grooves (38).

5. A marine stern drive unit (1) for connection to a marine engine (4) having an output and with said unit comprising, in combination:
(a) a generally vertical stern drive housing (6) forming an upper gear case (7), a lower gear case (8), and a propeller housing (9) mounting a propeller (10),
(b) a vertically extending elongated water chamber (33) disposed in said stern drive housing and with said water chamber having lower water intake means (34), and having upper water discharge means (35) for providing cooling water to the engine,
(c) lubrication-requiring drive elements (5, 11–19) disposed within said stern drive housing for connecting a said engine output with said propeller,
(d) an oil containing closed loop extending between the upper and lower portions of said stern drive housing, and with said loop communicating with said drive elements, said loop including:
 (1) first passage means (21, 23, 24) extending upwardly within said stern drive housing and communicating between said propeller housing and said upper gear case,
 (2) and return passage means (27, 28) extending downwardly within said stern drive housing and communicating between said upper gear case and said propeller housing,
(e) and cooperative elements (36, 37, 38) on said drive shaft (13) and on the interior of said sleeve (22) for recirculatingly pumping oil through said first passage means (21, 23, 24) and said return passage means (27, 28).

6. A marine stern drive unit (1) for connection to a marine engine (4) having an output and with said unit comprising, in combination:
(a) a generally vertical stern drive housing (6) forming an upper gear case (7), a lower gear case (8), and a propeller housing (9) mounting a propeller (10),
(b) a vertically extending water chamber (33) disposed in said stern drive housing and with said water chamber having lower water intake means (34), and having upper water discharge means (35) for providing cooling water to the engine,
(c) lubrication-requiring drive elements (5, 11–19) disposed within said stern drive housing for connecting a said engine output with said propeller,
(d) an oil containing passage means (21, 23, 24) extending upwardly within said stern drive housing and communicating between said propeller housing and said upper gear case,
(e) an elongated sleeve (22) extending vertically between said upper gear case and said propeller housing,
(f) a rotatable drive shaft (13) disposed within said sleeve and with said drive shaft being generally coextensive with said water chamber,
(g) said sleeve and said drive shaft forming at least a part of said passage means therebetween,
(h) and pump means comprising cooperative elements (36, 37, 38) on said drive shaft (13) and on the interior of said sleeve (22) for pumping oil through said passage means (21, 23, 24),
(i) said cooperative elements on said drive shaft (13) comprising threads (36) on the drive shaft body,
(j) and said cooperative elements on the interior of said sleeve comprising a plurality of arcuately spaced generally linear vertical grooves (37).

7. A marine stern drive unit (1) for connection to a marine engine (4) having an output and with said unit comprising, in combination:
(a) a generally vertical stern drive housing (6) forming an upper gear case (7), a lower gear case (8), and a propeller housing (9) mounting a propeller (10),
(b) a vertically extending water chamber (33) disposed in said stern drive housing and with said water chamber having lower water intake means (34), and having upper water discharge means (35) for providing cooling water to the engine,
(c) lubrication-requiring drive elements (5, 11–19) disposed within said stern drive housing for connecting a said engine output with said propeller,
(d) an oil containing passage means (21, 23, 24) extending upwardly within said stern drive housing and communicating between said propeller housing and said upper gear case,
(e) an elongated sleeve (22) extending vertically between said upper gear case and said propeller housing,
(f) a rotatable drive shaft (13) disposed within said sleeve and with said drive shaft being generally coextensive with said water chamber,
(g) said sleeve and said drive shaft forming at least a part of said passage means therebetween,
(h) and pump means comprising cooperative elements (36, 37, 38) on said drive shaft (13) and on the interior of said sleeve (22) for pumping oil through said passage means (21, 23, 24),
(i) said cooperative elements on said drive shaft (13) comprising threads (36) on the drive shaft body,
(j) and said cooperative elements on the interior of said sleeve comprising a plurality of spaced helical grooves (38).

* * * * *

UNITED STATES PATENT AND TRADEMARK OFFICE
CERTIFICATE OF CORRECTION

PATENT NO. : 4,764,135
DATED : August 16, 1988
INVENTOR(S) : Daniel F. McCormick It is certified that error appears in the above-identified patent and that said Letters Patent is hereby corrected as shown below:

Column 4, line 3, Delete "water means" and insert therefor --water intake means--

Signed and Sealed this

Third Day of January, 1989

Attest:

DONALD J. QUIGG

*Attesting Officer*   *Commissioner of Patents and Trademarks*